May 23, 1939.  C. A. CAMPBELL  2,159,686
AIR BRAKE
Filed May 24, 1938  2 Sheets-Sheet 1
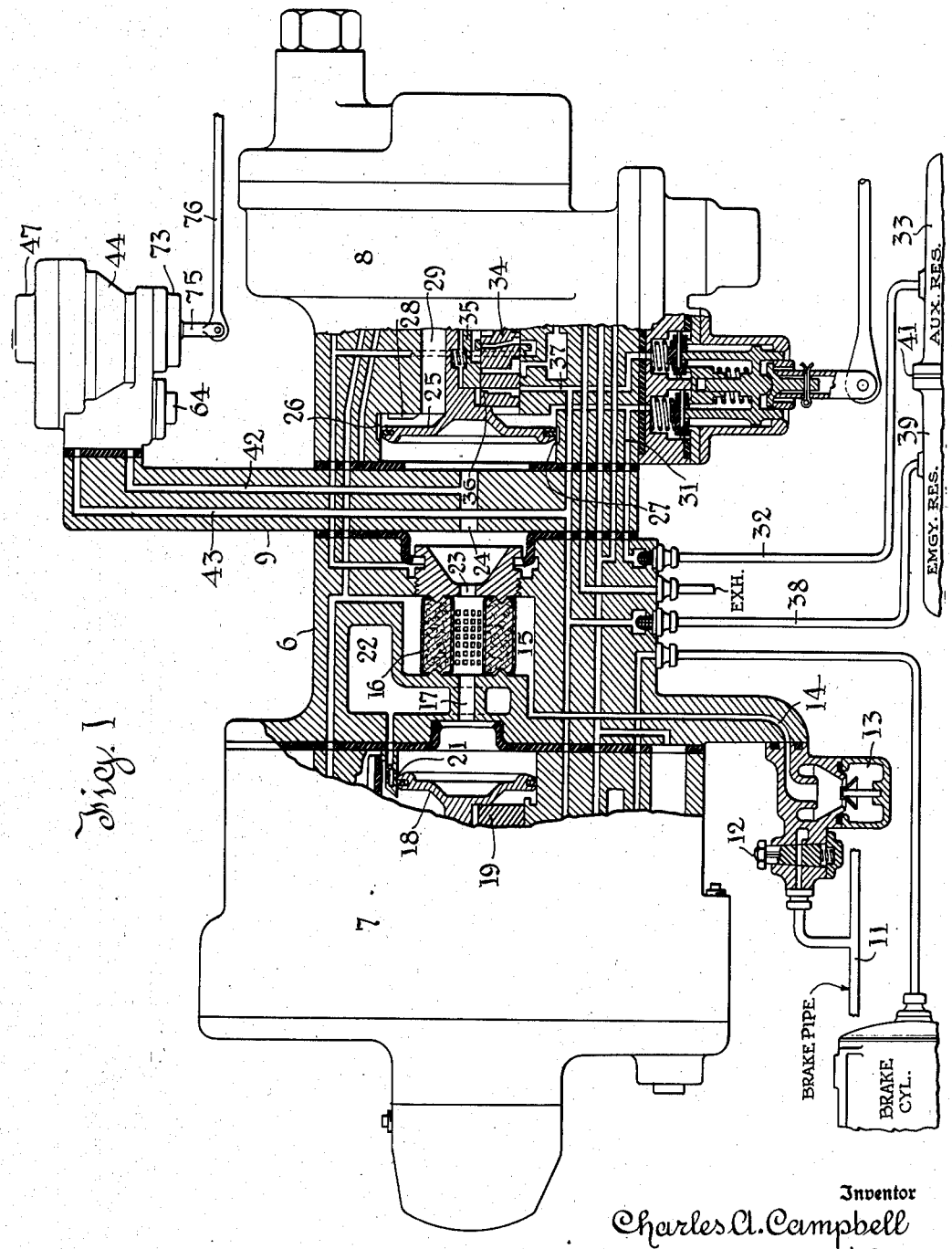

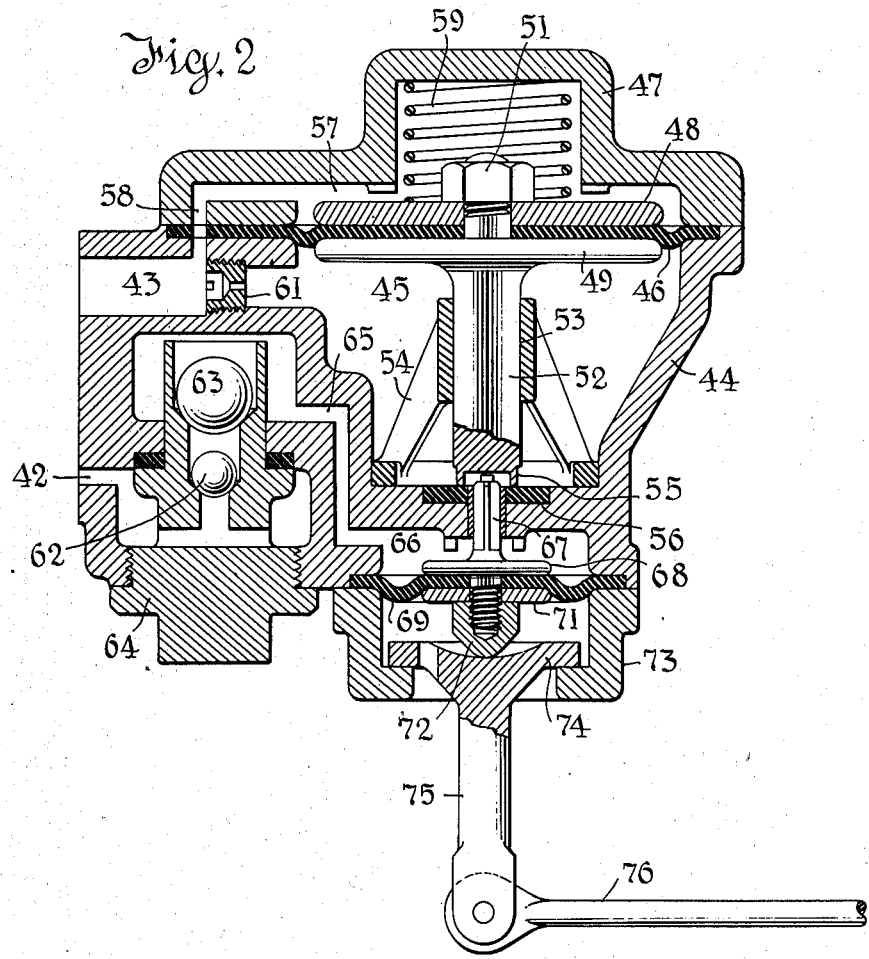

Patented May 23, 1939

2,159,686

UNITED STATES PATENT OFFICE 2,159,686

AIR BRAKE

Charles A. Campbell, Watertown, N. Y., assignor to The New York Air Brake Company, a corporation of New Jersey Application May 24, 1938, Serial No. 209,794

8 Claims. (Cl. 303—64)

This invention relates to air brakes and particularly to automatic air brakes of the type now standard on American railroads.

The standard triple valve known as the A-B valve comprises in addition to a pipe bracket on which the valve elements are mounted, a component known as the service portion and another component known as the emergency portion. Two reservoirs are used, an auxiliary reservoir and a somewhat larger emergency reservoir. The service portion controls charging of both reservoirs, release of the brakes, service flow to the brake cylinder and the quick service brake pipe venting functions. In addition this portion contains the release-insuring valve, the quick service limiting valve, and the by-pass checks which permit flow around the air filter in case this becomes clogged. The emergency portion controls charging of the quick action chamber, and the supply of emergency reservoir air to the brake cylinder in emergency applications, and contains also the emergency brake pipe vent valve, the spill-over check valve, the delayed build-up mechanism which controls the rate of development of brake pipe pressure in emergency, and the feed back mechanism which accelerates release following emergency applications.

The above functions are alluded to to indicate the general scope of the mechanism, but the only feature with which the present invention is concerned is reservoir charging. Accordingly, in the drawings, only so much of the mechanism will be shown in detail as is necessary to trace the charging flows.

As stated, the charging of the auxiliary and emergency reservoirs occurs through the service portion. In normal recharge obtained during moderate rises of brake pipe pressure, the flow is through two feed grooves in parallel past the triple piston to the slide valve chamber of the service portion, with which chamber the auxiliary reservoir is in free communication, and the emergency reservoir is in restricted communication through a charging port in the service slide valve. When, however, brake pipe pressure rises rapidly the triple piston moves inward against a retard stop to retarded recharge position. In this position one of the two charging ports is over-travelled by the triple piston so that the total charging flow is restricted to the capacity of one charging port. Under these circumstances, charging occurs at a relatively slow rate and the emergency reservoir reaches the full charge much later than the auxiliary reservoir because it has a greater volumetric capacity and flow to the emergency reservoir is delayed by slow flow through the restricted charging port in the service slide valve.

These characteristics are imposed by design features which are controlled by other functions of the valve and which therefore cannot be changed simply to raise the charging rate.

However, slow charging causes serious inconvenience when an uncharged or partially charged car is cut into a fully charged train. When this operation takes place the triple piston moves to restricted recharge position so that it takes between seven and ten minutes to charge the cut-in car fully; not because charging air for a more rapid rate is unavailable, but because the service piston inherently moves to a position in which charging occurs slowly.

It is important to charge the emergency reservoir fully before starting the train because if the emergency reservoir be charged to a materially lower pressure than the auxiliary reservoir and a service reduction be then made, the valve may fail to function. Such failure is caused by the fact that the emergency reservoir absorbs so much air by flow through the charging port that auxiliary reservoir pressure falls practically as rapidly as brake pipe pressure falls. Hence, the triple piston will stall and not shift to service position.

The present invention provides an auxiliary valve which may be applied to existing A-B equipment simply by installing a filler piece between the pipe bracket and the service portion of an A-B valve. This filler plate carries an auxiliary valve which may be operated to afford a charging by-pass from the brake pipe to the emergency reservoir.

The by-pass charging valve has certain important characteristics. In the first place, its capacity is such as to charge the emergency reservoir at a rate equal to or only slightly faster than the rate of charge of the auxiliary reservoir. Hence there is no danger that the demand for brake pipe air will materially reduce brake pipe pressure. The by-pass valve may be brought into action at will by simply pulling or pushing an actuator rod attached to an unseating lever and when so put into action will maintain the charging by-pass open until the charge in the emergency reservoir reaches a chosen value slightly lower than brake pipe pressure. For practical purposes a value of ten pounds lower than brake pipe pressure has been chosen, but this is a matter of design subject to variation. When this chosen value is reached by pressure in the emergency reservoir, the charging by-pass valve automatically restores itself to the normal closed position. From this position it cannot shift except upon manipulation of the unseating lever above mentioned.

The importance of the invention in expediting the movement of trains particularly during make-up operations, when an uncharged car or cars must be cut into a charged train, can be appreciated from the following comparison. With the A-B valves now standard, and assuming a normal brake pipe pressure of 70 pounds per square inch, it requires about 6 minutes to charge both reservoirs to 60 pounds, starting with completely uncharged reservoirs. It requires from 7 to 10 minutes to bring the reservoirs to a state of complete charge (70 pounds). The present invention permits both reservoirs to be charged to 60 pounds in 2¾ minutes and full charge (70 pounds) can be reached in about 4 minutes.

A preferred embodiment of the invention will now be described in connection with the accompanying drawings, in which:

Fig. 1 is a view partly in elevation and partly in section showing the standard A-B valve in normal release and recharge position with the filler piece and by-pass valve of the present invention applied.

Fig. 2 is an enlarged vertical section through the by-pass valve, the parts being shown in valve-closed position.

In Fig. 1, 6 represents the pipe bracket, 7 indicates generally the housing of the emergency portion, 8 indicates generally the housing of the service portion and 9 is the filler piece interposed between the pipe bracket 6 and the housing 8 of the service portion. The brake pipe 11 which extends through the train is connected to the pipe bracket through a cut-out cock 12 and dust collector 13. The brake pipe passage 14 leads to the chamber 15 around the annular filter cartridge 16, and the space within this cartridge communicates through an axial passage 17 with the space on the outer face of the emergency piston 18. The emergency slide valve is indicated at 19, and 21 is the charging port for the quick action chamber 22.

The space within the filter cartridge 16 also communicates through passage 23 and the passage 24 formed through the filler plate 9 with the space on the outer face of the service piston ("triple piston") 25. This piston is shown in normal charging position in which a feed groove 26 and a shorter feed groove 27 are both open. This is the release and recharge position assumed when brake pipe pressure rises slowly. When brake pipe pressure rises rapidly, as it does when an uncharged car is cut into a charged train, the piston moves to the right until arrested by the stop 28, in which position the charging groove 27 is overtraveled by the piston so that the charging rate to both reservoirs is limited to the capacity of the groove 26. The slide valve chamber 29 communicates by passage 31 and pipe 32 with the auxiliary reservoir 33. Charging flow to the emergency reservoir 39 occurs through a port in the service slide valve 34 which in both normal and restricted release position is uncovered by the graduating valve 35. The charging port in question is indicated at 36 and under the conditions named leads to a passage 37 which communicates through pipe 38 with the emergency reservoir 39.

In the drawings the two reservoirs appear to be the same length but persons familiar with the air brake art will understand that the dividing partition 41 which separates the two reservoirs is offset toward the auxiliary reservoir (see the patent to Eggleston, No. 2,021,255, November 19, 1935), so that the volume of the emergency reservoir is substantially greater than the volume of the auxiliary reservoir.

The purpose of the invention is to connect the brake pipe with the emergency reservoir by way of a flow limiting by-pass, which will permit the emergency reservoir to charge as rapidly as or slightly more rapidly than the auxiliary reservoir is charged through the groove 26. Consequently, the filler piece 9 contains a port 42 which communicates with the passage 24 and consequently with the brake pipe, and a passage 43 which communicates with the emergency reservoir passage 37 above described.

Reference may now be made to Fig. 2 in which extensions of the two passages 42 and 43 are identified by these same reference numerals.

The by-pass valve comprises a main body or housing 44 in which there is a chamber 45. The upper wall of the chamber 45 is a flexible diaphragm 46 of rubber-like material, which is clamped between the body 44 and a recessed cap 47. Clamped through the center of the diaphragm 46 are two plates 48 and 49 which are drawn together by the nut 51 threaded on a stem integral with the plate 49. Plate 49 also has a downward extending stem 52 which is guided at 53 in a spider 54, fixed in the body 44 as indicated. The lower end of stem 52 has a projecting valve rim 55 which seats on a centrally ported rubber seat 56 mounted in the lower wall of chamber 45. The space 57 above the diaphragm is in free communication by passage 58 with the emergency reservoir passage 43 and consequently is always at emergency reservoir pressure. A loading spring 59 reacts downward on the diaphragm and is of such strength as to cause the diaphragm to move downward when the pressure above the diaphragm approaches within 10 pounds of the pressure below the diaphragm. This 10 pound value is fixed by the assumption that the by-pass valve is to close at 60 pounds gauge, i. e., 10 pounds below a 70 pound gauge brake pipe pressure.

The chamber 45 is in restricted communication with the emergency reservoir passage 43 through a choke 61 whose capacity is so chosen that when the by-pass valve is open the air flow will be such as to charge the emergency reservoir at approximately the same or at a slightly more rapid rate than the auxiliary reservoir is charged through the feed groove 26.

The brake pipe passage 42 leads to the space below the upward opening check valves 62, 63 which for convenience are mounted in the insert or seat member 64 screwed into body 44. Brake pipe air, after passing the check valves, flows through passage 65 to a chamber 66 below the chamber 45. From there air flows between the flutes of a fluted stem 67 which leads through the opening in the center of the valve seat 56. The stem 67 may be forced up to lift stem 52 and diaphragm 46 to allow brake pipe air to flow into chamber 45.

In order to permit motion of the stem 67 without requiring the use of a packing gland, the stem 67 is flanged as indicated at 68 and this flange is clamped to the center of a diaphragm 69 by means of a disc 71 and nut 72. The margin of the diaphragm 69 is clamped between the body 44 and an annular cap 73. This cap retains the flanged head 74 of an unseating lever 75, the head 74 underlying the nut 72 at its center and being in contact therewith. A rod 76 may be pushed or pulled to cant the disc 74 and thus force the stem 67 and the stem 52 upward.

Operation

Assuming that a car equipped as shown in Figs. 1 and 2 is cut into a train of charged cars while the car so cut in is substantially or completely uncharged, the service piston 25 immediately moves to retarded recharge position as explained and charging flow starts through the groove 26. This limits the flow to both reservoirs. The emergency reservoir, because of the restriction at 36, charges slowly. If now the brakeman tilts the lever 75 and thus unseats the valve rim 55, brake pipe air at 70 pounds will pass the check valves 62, 63 and flow to the chamber 45 quite rapidly. Initially, the chamber 57 above the diaphragm is at atmospheric pressure because the emergency reservoir is not charged. The choke 61 limits the flow from the chamber 45 so that as soon as brake pipe air is admitted into the chamber 45 the pressure in that chamber rises rapidly and becomes substantially equal with brake pipe pressure.

It follows that the diaphragm 49 will be forced and held upward by a pressure of approximately 70 pounds per square inch. Charging flow to the emergency reservoir will occur directly by way of the choke 61 which fixes a charging rate about equal to that for the auxiliary reservoir. When the emergency reservoir pressure has risen to 60 pounds this pressure acting downward on the valve diaphragm 46 assisted by the spring 59, causes the diaphragm to move downward and re-seat the valve rim 55 on seat 56. As soon as this seating occurs the pressure above and below the diaphragm must remain equalized. The spring 59 will ensure a positive seating action.

Unless and until rod 76 is operated to unseat the by-pass valve, this by-pass valve will remain closed regardless of fluctuations of emergency reservoir pressure. Consequently, the A-B triple valve equipped with the invention will function in the normal manner except when the by-pass valve is manually opened. If the by-pass valve is opened it will close and remain closed if the emergency reservoir pressure approaches within 10 pounds of brake pipe pressure.

The device is capable of embodiment in other specifically different forms but the one illustrated is simple and inexpensive to construct and has desirable characteristics. For example, the maintenance of the reservoir charge is not dependent on the integrity of the diaphragm 46. The spring 54 will protect the reservoir charge by holding the valve rim 55 seated even if the diaphragm be ruptured. The failure of the diaphragm 69 can only cause an emergency application of the brakes because it would vent the brake pipe and nothing else. The check valves 62 and 63 preclude the possibility of back flow to the brake pipe under any circumstances so that the device can never function to prevent or delay a brake application as a result of back flow from the reservoir to the brake pipe.

What is claimed is:

1. The combination of a brake pipe; a reservoir; a brake controlling valve device arranged to control charging flow from the brake pipe to the reservoir; a charging valve biased in a closing direction and controlling a by-pass from the brake pipe directly to the reservoir; operator-operated means for opening said valve; and pressure controlled means rendered effective by the opening of said valve to inhibit closure of said valve while reservoir pressure is substantially below brake pipe pressure and cause closure upon approach to equalization of such pressures.

2. The combination of a brake pipe; a reservoir; a brake controlling valve device arranged to control charging flow from the brake pipe to the reservoir; a charging valve biased in a closing direction and controlling a by-pass from the brake pipe directly to the reservoir; operator-operated means for opening said valve; pressure controlled means rendered effective by the opening of said valve to inhibit closure of said valve while reservoir pressure is substantially below brake pipe pressure and cause closure upon approach to equalization of such pressures; and means for preventing back-flow through said valve from reservoir to brake pipe.

3. The combination defined in claim 1, in which the pressure controlled means comprises a movable abutment operatively connected with the by-pass valve, and separating a closing pressure chamber in free communication and an opening pressure chamber in restricted communication with said reservoir, said opening pressure chamber being arranged to be placed in free communication with the brake pipe by the opening of the by-pass valve.

4. The combination of a brake pipe; a pair of reservoirs; a brake controlling valve device having a charging port through which charging flow from the brake pipe to both reservoirs passes, and having a second charging passage in series with said charging port and through which charging flow to the second reservoir passes; a by-pass valve controlling flow from the brake pipe directly to said second reservoir; means effective to impart to said by-pass valve when closed a substantial closing bias; operator-operated means for opening said by-pass valve; and pressure controlled means responsive to the differential effect of brake pipe pressure and pressure in said second reservoir when said by-pass valve is opened, to inhibit closure thereof when said reservoir pressure is substantially below brake pipe pressure and cause closure upon approach to equalization.

5. The combination of a brake pipe; a pair of reservoirs of unequal volume; a brake controlling valve device having a charging port through which charging flow from the brake pipe to both reservoirs passes, and having a second charging passage in series with said charging port and through which charging flow to the larger reservoir passes; a by-pass valve controlling flow from the brake pipe directly to the larger reservoir; means effective to impart to said by-pass valve when closed a substantial closing bias; operator-operated means for opening said by-pass valve; and pressure controlled means responsive to the differential effect of brake pipe pressure and pressure in the larger reservoir when said by-pass valve is opened, to inhibit closure thereof when said reservoir pressure is substantially below brake pipe pressure and cause closure upon approach to equalization.

6. The combination defined in claim 4 in which the pressure controlled means comprises a movable abutment operatively connected with the by-pass valve, and separating a closing pressure chamber in free communication and an opening pressure chamber in restricted communication with said reservoir, said opening pressure chamber being arranged to be placed in free communication with the brake pipe by the opening of the by-pass valve.

7. The combination with the structure defined in claim 4 of means independent of said by-pass valve for preventing back-flow through said valve from reservoir to brake pipe.

8. The combination with a brake controlling valve structure comprising a service valve mechanism, an emergency valve mechanism and a bracket having connections for brake pipe, brake cylinder, service reservoir and emergency reservoir and ported mounting seats for said service valve mechanism and for said emergency valve mechanism; of a ported filler piece interposed between one of said portions and its mounting seat and serving to connect said portion with said bracket and to afford branch connections with the brake pipe and emergency reservoir connections therein; and a by-pass charging valve device mounted on said filler piece and serving to connect and disconnect said branch connections, said by-pass charging valve device comprising a valve controlling communication between said branch connections, means effective to impart to said valve when closed a substantial closing bias, operator-operated means for opening said valve, and pressure controlled means responsive to the differential of pressures between said branch connections when said valve is open to inhibit closure thereof unless and until emergency reservoir pressure is nearly as great as brake pipe pressure.

CHARLES A. CAMPBELL.